United States Patent
Guarnera et al.

(10) Patent No.: US 7,791,648 B2
(45) Date of Patent: Sep. 7, 2010

(54) METHOD AND SYSTEM FOR DE-MOSAICING ARTIFACT REMOVAL, AND COMPUTER PROGRAM PRODUCT THEREFOR

(75) Inventors: Mirko Ignazio Guarnera, Gela (IT); Giuseppe Messina, Giardini Naxos (IT); Valeria Tomaselli, S. Pietro Clarenza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1359 days.

(21) Appl. No.: 11/252,376

(22) Filed: Oct. 18, 2005

(65) Prior Publication Data

US 2006/0087567 A1 Apr. 27, 2006

(30) Foreign Application Priority Data

Oct. 21, 2004 (EP) .................................. 04025002

(51) Int. Cl.
*H04N 9/73* (2006.01)
(52) U.S. Cl. ................................................. 348/223.1
(58) Field of Classification Search ................. 348/252, 348/246
See application file for complete search history.

(56) References Cited

U.S. PATENT DOCUMENTS

| | | | |
|---|---|---|---|
| 4,724,395 A | 2/1988 | Freeman | |
| 5,778,106 A | 7/1998 | Juenger et al. | 382/275 |
| 6,914,628 B1 * | 7/2005 | Kuwata et al. | 348/272 |
| 7,492,396 B2 * | 2/2009 | Kim et al. | 348/234 |
| 2003/0025814 A1 | 2/2003 | Hunter et al. | 348/272 |
| 2003/0052981 A1 * | 3/2003 | Kakarala et al. | 348/272 |
| 2003/0086606 A1 * | 5/2003 | Hunter et al. | 382/167 |

FOREIGN PATENT DOCUMENTS

EP 0920221 A2 6/1999

OTHER PUBLICATIONS

Lu, W. et al., "Color Filter Array Demosaicking: New Method and Performance Measures", *IEEE Transactions on Image Processing*, 12(10):1194-1210, Oct. 10, 2003.
Chang, L. et al., "Adaptive Color Filter Array Demosaicking With Artifact Suppression", in *Proceedings of the 2004 Int'l. Symposium on Circuits and Systems*, Vancouver, BC, Canada, May 23, 2004, pp. 937-940.

* cited by examiner

*Primary Examiner*—Luong T Nguyen
(74) *Attorney, Agent, or Firm*—Lisa K. Jorgenson; Timothy L. Boller; Seed IP Law Group PLLC (57) ABSTRACT

Color image signals, as derived, e.g., by interpolating the output from a color filter array are arranged in pixels, each pixel having associated detected color information for a first color as well as undetected filled-in color information for at least a second and a third color. The images are thus exposed to false color and zipper effect artifacts, and are subject to processing preferably including the steps of: checking the images for the presence of zipper effect artifacts, and i) if the checking reveals the presence of zipper effect artifacts, applying a zipper effect removal process to the image signals; ii) if the checking fails to reveal the presence of zipper effect artifacts, applying a false color removal process to the image signals. False color and zipper effect artifacts are thus preferably both reduced by adaptively using the zipper effect removal process and the false color removal process.

39 Claims, 2 Drawing Sheets

METHOD AND SYSTEM FOR DE-MOSAICING ARTIFACT REMOVAL, AND COMPUTER PROGRAM PRODUCT THEREFOR

BACKGROUND OF THE INVENTION

1. Field of the Invention

The invention relates to image/video processing techniques.

Specifically, the invention relates to de-mosaicing artifact removal, and was developed by paying attention to the possible application to digital cameras. Reference to this possible field of application is not however to be construed in a limiting sense of the scope of the invention.

2. Description of the Related Art

Digital still cameras include two-dimensional image sensing arrays, such as a Charge Coupled Device (CCD) that integrates incident scene light over a predetermined time to provide an electronic information signal corresponding to the scene light intensity incident to the array. Such a two-dimensional image-sensing array comprises a predetermined number of discrete image sensing elements or pixels, which respond to incident illumination to provide an electronic information signal corresponding to the intensity of the incident illumination.

Figure 1:
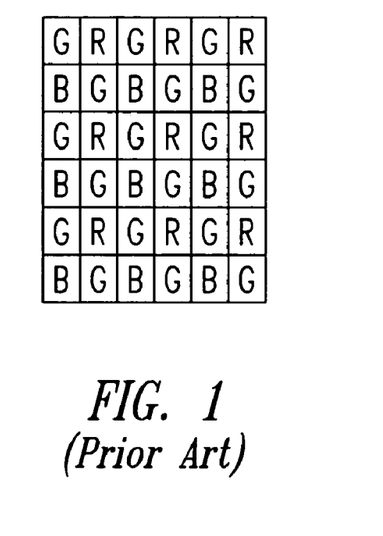

In order to record color images through a single sensor, the surface of the sensor is covered with a mosaic of colored filters. This kind of sensor is called a Color Filter Array (CFA). In essence, each pixel has its own spectrally selective filter to peer through. The most popular color filter array pattern used today is the Bayer Pattern, which is shown in FIG. 1.

Since each image sensing element can only detect one color of illumination (R=Red, G=Green, B=Blue), the color information for the other colors not detected by that image sensing element must be filled in; thus achieving a "de-mosaicing" effect, which is usually achieved by interpolation.

Conventional types of interpolation, however, can provide images with objectionable aliasing artifacts such as "color fringes" near sharp edges. There are two main types of de-mosaicing artifacts, named false colors and zipper effect. False colors are those artifacts corresponding to noticeable color errors as compared to the original, non-mosaiced image. The zipper effect refers to abrupt or unnatural changes of color differences between neighboring pixels, manifesting as an "on-off" pattern.

A conventional approach to solve these problems is to eliminate the color fringes at the expenses of image sharpness by blurring the picture, so that the edges are not sharp enough to create a color fringe. Blurring the image in this manner, however, has its obvious disadvantages resulting in a reduction in resolution. Therefore, it is necessary to provide a de-mosaicing artifact removal technique that reduces color fringing without the amount of blurring otherwise required.

A technique to resolve color fringes without blurring the images is proposed in U.S. Pat. No. 4,724,395.

The approach disclosed in U.S. Pat. No. 4,724,395 stems from the consideration that natural images exhibit a strong correlation of the red, green and blue channels, especially for high frequencies, so that they are likely to have the same texture and edge locations.

Because of this inter-channel correlation, the difference between two colors in a neighborhood is nearly constant, while it rapidly increases and decreases in the area of sharp gray edges, where color interpolation has introduced false colors. The approach of U.S. Pat. No. 4,724,395 applies a median filter to the inter-channel differences in a neighborhood and then uses the resulting value to force pixels with distinct colors to be more similar to their neighbors, avoiding false colors. Moreover, the Color Filter Array color value at each pixel is not altered.

In general, the approach of U.S. Pat. No. 4,724,395 is rather effective in suppressing de-mosaicing artifacts, while preserving sharp edges. However, some de-mosaicing artifacts still remain around sharp edges and fine details. This is partly due to the fact that each pixel has independent inter-channel differences, and filtering the differences separately does not take into account the spectral correlation between color planes.

The arrangement disclosed in Wenmiao Lu, Yap-Peng Tan, "Color Filter Array De-mosaicing: New Method and Performance Measures", IEEE Transactions on Image Processing, vol. 12, no. 10, Oct. 2003, incorporates median filtering with the spectral correlation for more effective suppression of de-mosaicing artifacts by lifting the constraint of keeping the original CFA-sampled color values intact. Furthermore, Lu et al. make use of the latest processed color values to filter the subsequent pixels so that estimation errors can be effectively diffused into local neighborhoods.

To sum up, the approach of U.S. Pat. No. 4,724,395 does not remove all the artifacts introduced by conventional color interpolation techniques, and moreover, under certain conditions, produces an annoying zipper effect in the horizontal and vertical directions.

Conversely, the approach of Lu et al. removes more extensively false colors and artifacts in comparison with the approach of U.S. Pat. No. 4,724,395, but considerably blurs the images, because it adjusts the green channel of each pixel by means of an average of both the red and blue values of the same pixel.

BRIEF SUMMARY OF THE INVENTION

In view of the foregoing, the need is felt for an improved arrangement that may dispense with the disadvantages of the prior art arrangements discussed in the foregoing.

One embodiment of the present invention is a method having the features set forth in the claims that follow, these claims being an integral part of the disclosure of the present invention. The invention also relates to a corresponding system as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the invention provides for processing image signals arranged in pixels, each pixel having associated detected color information for a first color as well as undetected, filled-in (e.g., interpolated) color information for at least a second and a third color, whereby said images are exposed to false color and zipper effect artifacts. Such preferred embodiment of the invention includes the steps of:
  checking said images for the presence of zipper effect artifacts, and
  i) if said checking reveals the presence of zipper effect artifacts, applying a zipper effect removal process to said image signals;

ii) if said checking fails to reveal the presence of zipper effect artifacts, applying a false color removal process to said image signals, whereby said false color and zipper effect artifacts are both reduced by adaptively using said zipper effect removal process and said false color removal process.

Such an adaptive approach, whereby false color and zipper effect artifacts are both reduced by adaptively using said zipper effect removal process and said false color removal process is held to constitute a presently preferred embodiment of the invention. However the invention is in no way limited to such preferred embodiment, and also encompasses arrangements wherein only one of said zipper effect removal process and said false color removal process is performed.

BRIEF DESCRIPTION OF THE SEVERAL VIEWS OF THE DRAWINGS

The invention will now be described, by way of example only, with reference to the enclosed figures of drawing, wherein:

FIG. 1 has been already described in the foregoing;

DETAILED DESCRIPTION OF THE INVENTION

The main operating principles of the exemplary arrangement described herein (which corresponds to the presently preferred embodiment specifically mentioned in the foregoing) can be expressed as follows:

the technique is assumed to be applied on a set of pixels;

for each pixel, the color channel whose sample is available from the CFA (e.g., Bayer) pattern is left unchanged;

inter-channel correlation is taken into account, considering two inter-channel differences (red-green and blue-green) median filtered over a given neighborhood and using these two differences together to filter pixels;

these latest processed color values are used to filter the subsequent pixels;

false colors and zipper effect are both reduced by adaptively using two different blocks.

Figure 2:
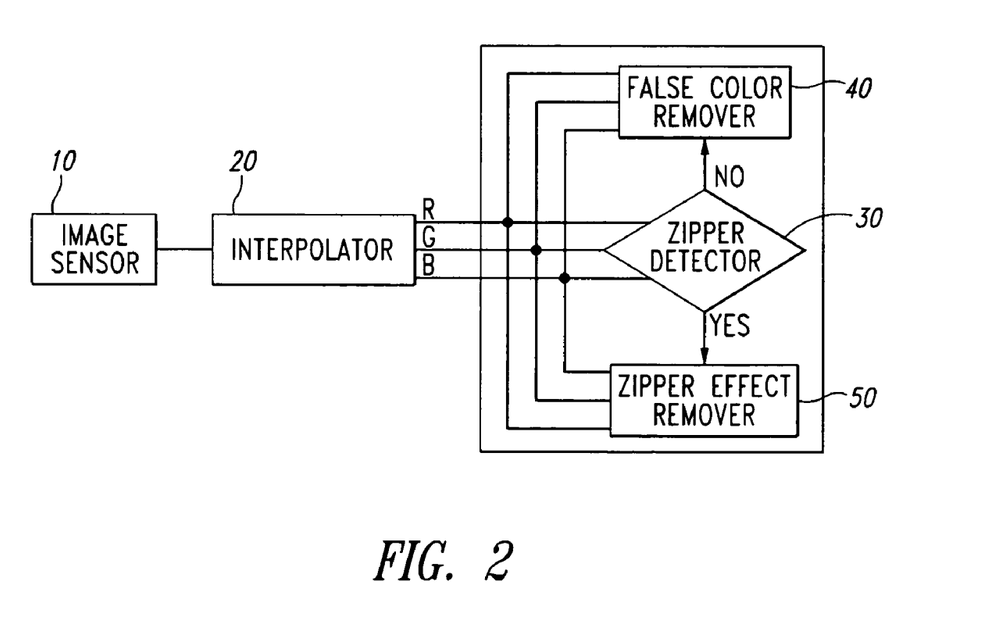
FIG. 2 is a schematic block diagram of a de-mosaicing artifact removal technique described herein.

A block diagram representing the de-mosaicing artifact removal technique described herein is shown in FIG. 2.

In FIG. 2, reference number 10 designates an image sensor adapted to generate an image signal arranged in, e.g., a Bayer pattern (or, notionally, any other CFA pattern); in the same Figure, reference 20 designates an interpolator block, and reference 30 designates a zipper detector block.

The zipper detector block 30 operates according to a given zipper effect characterization to produce a control signal which enables a false color removal block 40 and/or a zipper effect removal block 50. For ease of description the blocks 40 and 50 are shown herein as totally independent modules. It will however become apparent from the following description that these modules may advantageously share certain sub-modules, i.e., being jointly configured for performing operations that are common to the false color removal process and the zipper effect removal process described in detail in the following.

The zipper detector block 30 produces its output control signal by verifying if those conditions that determine zipper effect are satisfied or not.

The zipper effect is due to sudden variations of color differences between neighboring pixels.

As an example, assume that the central pixel of a local window belongs to a dark horizontal line within a light homogeneous region. Both the blue-green and the red-green differences along the line will be very different from those calculated for the rest of the mask. Therefore, if the missing color channels at the central pixel are reconstructed through these wrong differences, an "on-off" pattern will be generated.

More specifically, zipper effect arises when the following three conditions are satisfied:

along the horizontal (vertical) direction passing through the central pixel, the inter-channel difference between the green channel and the other one (for which we have the original sampled values) is almost constant;

along the vertical (horizontal) direction the inter-channel difference between the green channel and the other one (for which we have the original sampled values) is not constant;

the trend of the central pixel channel in the vertical (horizontal) direction is increasing or decreasing, or there is a minimum or a maximum in the central pixel.

Preferably, these three conditions are evaluated on a 5×5 mask, but the dimensions of such a mask are not per se critical: for instance it is also possible to use a 3×3 mask.

If these conditions are satisfied, the zipper detector block 30 enables the zipper effect removal algorithm (block 50); otherwise it enables the false colors removal algorithm (block 40).

The first two conditions state that inter-channel differences are almost constant along a direction and not constant in the orthogonal one. In order to verify both these two conditions, the similarity among inter-channel differences has been evaluated according to a given threshold. An increase in the value of this threshold causes the growth of the amount of removed zipper effect. However, the three causes of the zipper effect could be satisfied by pixels belonging to detailed regions of an image, leading to a reduction in details. A trade off between zipper effect reduction and detail preservation should be considered by appropriately setting the threshold.

The third condition states that the trend of the central pixel channel, along the direction having not constant inter-channel differences, follows a precise law. In particular, this trend:

is increasing or decreasing if the pixel belongs to a line separating a dark region and a light one;

has a minimum if the pixel belongs to a dark line within a light background;

has a maximum if the pixel belongs to a light line within a dark background.

The false colors removal block 40 adjusts the three color values at the central pixel of a local window distinguishing the following two cases, according to the original sampled channel of the central pixel:

G Case $$\hat{H}_{CENTER} = G_{CENTER} + v_{HG}$$

$$\hat{G}_{CENTER} = G_{CENTER}$$

$$\hat{J}_{CENTER} = G_{CENTER} + v_{JG} \quad (1)$$

R/B Case (e.g., H)

$$\hat{H}_{CENTER} = H_{CENTER}$$

$$\hat{G}_{CENTER} = H_{CENTER} - v_{HG}$$

$$\hat{J}_{CENTER} = H_{CENTER} - v_{HG} + v_{JG} \quad (2)$$

where:

$v_{HG} = \text{median}\{H_{ij} - G_{ij} | (i,j) \in \Re\}$, $v_{JG} = \text{median}\{J_{ij} - G_{ij} | (i,j) \in \Re\}$ G is green (G), H is red (R) or blue (B) and J is blue (B) or red (R), respectively, and $\mathfrak{R}$ is the support of the median filter that covers 3×3 pixels. Alternatively, a local window with different dimensions, such as, e.g., 5×5 pixels, can be used.

As in the technique proposed by Lu et al. discussed in the introductory portion of this description, the color values of the central pixel are replaced by $\hat{H}_{CENTER}$, $\hat{G}_{CENTER}$ and $\hat{J}_{CENTER}$, so that they will be involved in filtering the following pixels, spreading the estimation errors into local neighborhoods.

Additionally, it will be appreciated that, in direct comparison with the arrangement of U.S. Pat. No. 4,724,395, in the arrangement described herein for those pixels which receive only red or blue light, i.e., the blue and red color, respectively, the information concerning the "missing" colors (and specifically the information concerning the blue color for those pixels which receive only red light, and the information concerning the red color for those pixels which receive only blue light) is computed by using both median filtered inter-channel differences ($v_{HG}$ and $v_{JG}$), and hence the spectral correlation between color planes is taken into account. Thanks to this solution this technique efficiently eliminates false colors without blurring the image.

The false colors removal block 40 computes both the two missing colors by using the median filtered inter-channel differences. The zipper effect removal block 50, instead, calculates one missing color as an average of some surrounding pixels of the central pixel. In detail, these pixels (preferably derived from the CFA—e.g., Bayer—pattern produced by the sensor 10) are chosen along the direction that has almost constant inter-channel differences. The other missing color is computed by adding, to the reconstructed green channel, the appropriate median filtered inter-channel difference.

We have to distinguish two different cases, according to the original sampled color of the central pixel (G case and R/B case).

The two equations for zipper effect suppression can be written as follows:

G Case $$\hat{G}_{CENTER} = G_{CENTER}$$

$$\hat{H}_{CENTER} = f(H_{SURROUND})$$

$$\hat{J}_{CENTER} = G_{CENTER} + v_{JG} \quad (3)$$

R/B Case (e.g., H)

$$\hat{G}_{CENTER} = f(G_{SURROUND})$$

$$\hat{H}_{CENTER} = H_{CENTER}$$

$$\hat{J}_{CENTER} = \hat{G}_{CENTER} + v_{JG} \quad (4)$$

where $f(\cdot)$ is an average operator, whose inputs are the surrounding pixels ($H_{SURROUND}$ or $G_{SURROUND}$), along the direction provided by the zipper detector block;

$$v_{JG} = \text{median}\{J_{ij} - G_{ij} | (i,j) \in \mathfrak{R}\}$$

G is green (G), H is red (R) or blue (B) and J is blue (B) or red (R), respectively, and $\mathfrak{R}$ is the support of the median filter which covers 3×3 pixels. Other support dimensions, such as, e.g., 5×5 pixels can be used As in the false colors removal algorithm, the new values $\hat{G}_{CENTER}$, $\hat{H}_{CENTER}$ and $\hat{J}_{CENTER}$ will replace the colors of the central pixel.

Figure 3:
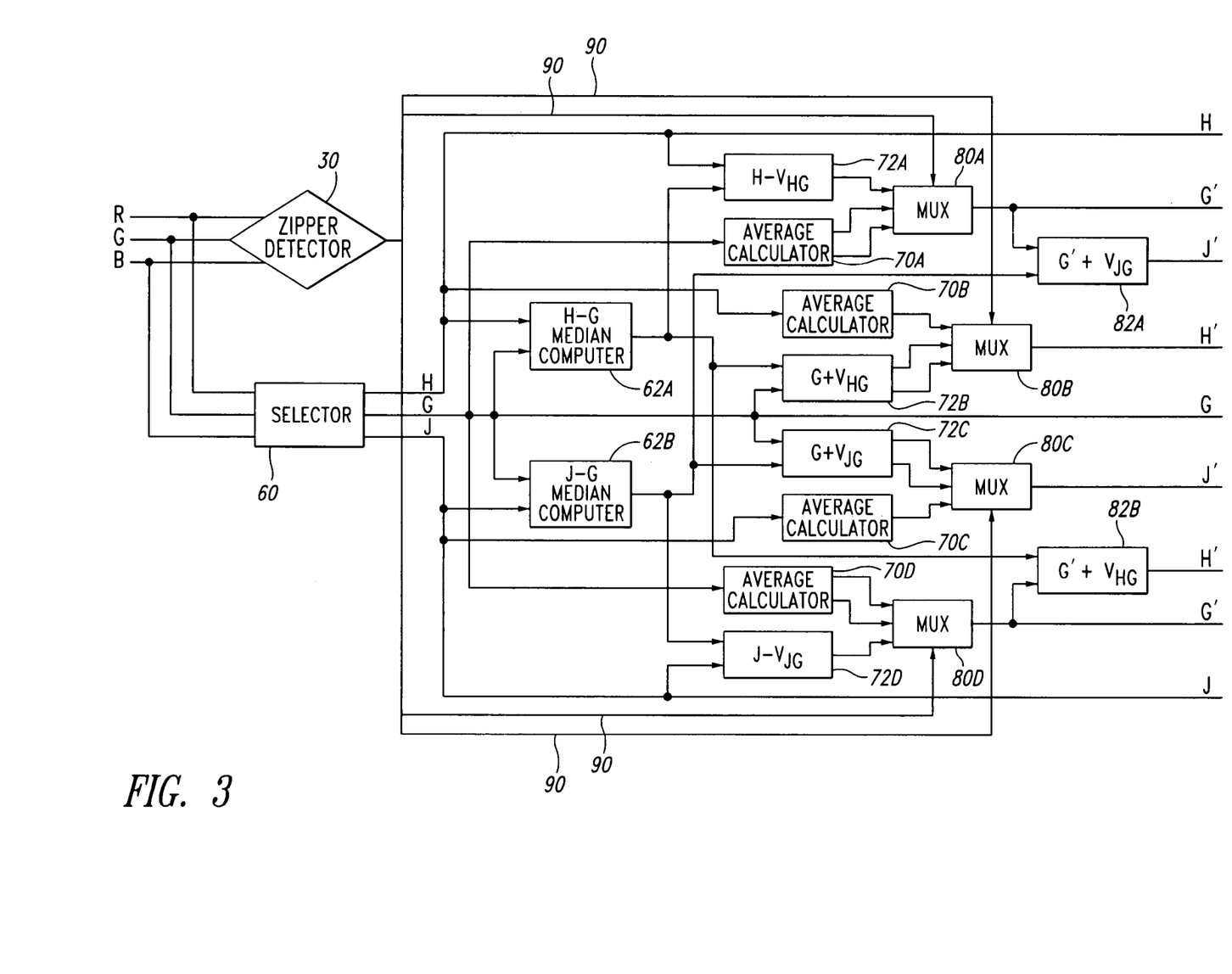
FIG. 3 is a detailed block scheme of the arrangement described herein.

FIG. 3 is an exemplary block diagram of circuitry adapted to implement the rules presented above (i.e., eqs. 1 to 4 above).

Specifically, in FIG. 3, the selector block 60, according to the central pixel channel, activates one of the three possible flow paths (H, G, J), enabling the blocks involved in the related calculation, while two blocks designated 62A and 62B compute the two median values H–G ($v_{HG}$), and J–G ($v_{JG}$), respectively.

The blocks designated 70A, 70B, 70C, and 70D each calculate two directional average values as average of some surrounding pixels of the central pixel. The blocks designated 72A, 72B, 72C, and 72D calculate the values H–$v_{HG}$, G+$v_{HG}$, G+$v_{JG}$, and J–$v_{JG}$, respectively.

Multiplexers designated 80A, 80B, 80C, and 80D each select (under control signals provided via lines 90 by the zipper detector block 30) a respective output out of a set of three possibilities inputs, while the blocks designated 82A and 82B produce the values G'+$v_{JG}$ and G'+$v_{HG}$. The various blocks just described thus produce the signals H, G', J'; H', G, J'; and H', G', J over output lines designated by corresponding references in FIG. 3.

Without prejudice to the underlying principles of the invention, the details and the embodiments may vary, also appreciably, with reference to what has been described by way of example only, without departing from the scope of the invention as defined by the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method of processing color image signals of images arranged in pixels, each pixel having associated detected color information for a first color as well as undetected filled-in color information for a second and a third color, whereby said images are exposed to the presence of false color and zipper effect artifacts, the method comprising the steps of:
    checking said color image signals for the presence of zipper effect artifacts, wherein said checking for the presence of zipper effect artifacts includes checking conditions that inter-channel differences between one of said second and third colors and said first color are almost constant along one direction of said images and not constant in a direction orthogonal thereto; and
    i) if said checking reveals the presence of zipper effect artifacts, applying a zipper effect removal process to said color image signals;
    ii) if said checking fails to reveal the presence of zipper effect artifacts, applying a false color removal process to said color image signals,
    whereby said false color and zipper effect artifacts are both reduced by adaptively using said zipper effect removal process and said false color removal process.

2. The method of claim 1 wherein said checking said conditions includes the step of evaluating a similarity of said inter-channel differences against a threshold, whereby increasing said threshold increased the amount of zipper effect removed by said zipper effect removal process.

3. The method of claim 1 wherein said checking for the presence of zipper effect artifacts includes checking, along said orthogonal direction having not constant inter-channel differences, whether a given pixel:
    belongs to a line separating a dark region and a light one in a respective image;
    belongs to a dark line within a light background in the respective image;
    belongs to a light line within a dark background in the respective image.

4. The method of claim 1 wherein said checking for the presence of zipper effect artifacts includes checking that:
- along a first direction passing through a given central pixel, an inter-channel difference between one of said second and third colors and said first color is substantially constant;
- along a second direction, orthogonal to said first direction, an inter-channel difference between one of said second and third colors and said first color is not constant; and
- a trend of a channel of the central pixel in said second direction is increasing or decreasing, or there is a minimum or a maximum in said given central pixel.

5. The method of claim 1, wherein said step of checking for the presence of zipper effect artifacts is performed on a mask of pixels.

6. The method of claim 5, wherein said step of checking for the presence of zipper effect artifacts is performed on a mask of pixels selected out of a 5×5 mask of pixels and a 3×3 mask of pixels.

7. The method of claim 1, wherein both said zipper effect removal process and said false color removal process include the steps of:
- for each pixel, leaving unchanged said detected color information for the first color;
- for said each pixel, selecting a neighborhood of said each pixel;
- producing at least one filtered interchannel difference over said neighborhood of said each pixel, said at least one filtered interchannel difference involving one of said undetected filled-in color information for the second and third colors; and
- using said at least one filtered interchannel difference for performing both said zipper effect removal process and said false color removal process.

8. A method of removing zipper effect artifacts from color image signals arranged in pixels, each pixel having associated detected color information for a first color as well as undetected filled-in color information for a second and a third color, the method comprising the steps of:
- for each pixel, leaving unchanged said associated detected color information for the first color;
- for said each pixel, selecting a given neighborhood of said each pixel;
- producing at least one filtered interchannel difference over said given neighborhood of said each pixel, said at least one filtered interchannel difference involving one of said second and third colors;
- adding to the color corresponding to one of said undetected filled-in color information, said at least one filtered interchannel difference; and
- calculating the other of said second and third colors as an average of some surrounding pixels of said each pixel.

9. The method of claim 8, further comprising the step of selecting surrounding pixels along a direction wherein said at least one inter-channel difference is substantially constant.

10. The method of either of claim 8, wherein said least one filtered interchannel difference over said given neighborhood of said each pixel is a median filtered interchannel difference.

11. The method of claim 8, wherein said color image signals are red-green-blue image signals, and said zipper effect removal process includes the steps of:
- if said first color is green, setting:

$\hat{G}_{CENTER} = G_{CENTER}$ $\hat{H}_{CENTER} = f(H_{SURROUND})$ $\hat{J}_{CENTER} = G_{CENTER} + v_{JG}$ if said first color is red or blue, setting:

$\hat{G}_{CENTER} = f(G_{SURROUND})$ $\hat{H}_{CENTER} = H_{CENTER}$ $\hat{J}_{CENTER} = \hat{G}_{CENTER} + v_{JG}$ where:
- G is green, H is red or blue and J is blue or red, respectively;
- $\ldots_{CENTER}$ designates said each pixel;
- ^ denotes the signals resulting from the zipper effect removal process and replacing the colors at said each pixel;
- $f(\cdot)$ is an average operator, whose inputs are the pixels surrounding said each pixel, along the direction provided by zipper detection;
- $v_{JG} = \text{median}\{J_{ij} - G_{ij} | (i,j) \in \Re\}$ is said at least one interchannel difference;
- and $\Re$ is the support of a median filter which covers said given neighborhood.

12. The method of claim 8, wherein said given neighborhood is selected out of a neighborhood including 3×3 pixels and a neighborhood including 5×5 pixels.

13. A method of processing color image signals of images arranged in pixels, each pixel having associated detected color information for a first color as well as undetected filled-in color information for a second and a third color, whereby said images are exposed to the presence of false color and zipper effect artifacts, the method comprising the steps of:
- checking said color image signals for the presence of zipper effect artifacts, and
  - i) if said checking reveals the presence of zipper effect artifacts, applying a zipper effect removal process to said color image signals;
  - ii) if said checking fails to reveal the presence of zipper effect artifacts, applying a false color removal process to said color image signals,
- whereby said false color and zipper effect artifacts are both reduced by adaptively using said zipper effect removal process and said false color removal process, and wherein the false color removal process comprises:
- for each pixel, leaving unchanged said detected color information for the first color;
- selecting a given neighborhood of said each pixel;
- producing at least two filtered interchannel differences over said given neighborhood of said each pixel, said at least two filtered interchannel differences involving said second and third colors; and
- effecting said false color removal process using the at least two filtered interchannel differences, whereby a spectral correlation between color planes is taken into account in said false color removal process.

14. The method of claim 13 wherein the at least two filtered interchannel differences are used for false color removal from both said undetected filled-in color information for the second and third colors.

15. The method of claim 13 wherein the at least two filtered interchannel differences are median filtered interchannel differences over said given neighborhood of said each pixel.

16. The method of claim 13, wherein said color image signals are red-green-blue image signals and said false color removal process includes the steps of:
- if said first color is green, setting:

$\hat{H}_{CENTER} = G_{CENTER} + v_{HG}$ $\hat{G}_{CENTER} = G_{CENTER}$ $\hat{J}_{CENTER} = G_{CENTER} + v_{JG}$ if said first color is either red or blue, setting:

$\hat{H}_{CENTER} = H_{CENTER}$ $\hat{G}_{CENTER} = H_{CENTER} - v_{HG}$ $\hat{J}_{CENTER} = H_{CENTER} - v_{HG} + v_{JG}$ where:

G is green, H is red or blue and J is blue or red, respectively;

$\ldots_{CENTER}$ designates said each pixel;

$\hat{}$ denotes the signals resulting from the false color removal process and replacing the colors at said each pixel;

$v_{HG} = \text{median}\{H_{ij} - G_{ij} | (i,j) \in \Re\}$, $v_{JG} = \text{median}\{J_{ij} - G_{ij} | (i,j) \in \Re\}$ are said interchannel differences; and $\Re$ is the support of a median filter which covers a local window surrounding said each pixel.

17. The method of claim 16, wherein said local window is selected out of windows including 3×3 pixels and 5×5 pixels.

18. A system for processing color image signals of images arranged in pixels, each pixel having associated detected color information for a first color as well as undetected filled-in color information for a second and a third color, whereby said images are exposed to the presence of false color and zipper effect artifacts, the system comprising:
   a zipper detector configured to check said images for the presence of zipper effect artifacts, wherein said zipper detector is configured to check conditions that inter-channel differences between one of said second and third colors and said first color are almost constant along one direction of said images and not constant in a direction orthogonal thereto;
   a zipper effect removal module configured to apply a zipper effect removal process to said color image signals if a checking by said zipper detector reveals the presence of zipper effect artifacts; and
   a false color removal module configured to apply a false color removal process to said color image signals if said checking by said zipper detector fails to reveal the presence of zipper effect artifacts;
   wherein said false color and zipper effect artifacts are both reduced by adaptively using said zipper effect removal process and said false color removal process.

19. The system of claim 18 wherein said zipper detector is configured to evaluate a similarity of said inter-channel differences against a given threshold, whereby increasing said threshold increased an amount of zipper effect artifacts removed by said zipper effect removal process.

20. The system of claim 18 wherein said zipper detector is configured for checking, along said direction orthogonal having not constant inter-channel differences, whether a given pixel:
   belongs to a line separating a dark region and a light region in a respective image;
   belongs to a dark line within a light background in the respective image;
   belongs to a light line within a dark background in the respective image.

21. The system of claim 18 wherein said zipper detector is configured for checking that:
   along a first direction passing through a central pixel, an inter-channel difference between one of said second and third colors and said first color is substantially constant;
   along a second direction, orthogonal to said first direction, an inter-channel difference between one of said second and third colors and said first color is not constant;
   a trend of a central pixel channel in said second direction is increasing or decreasing, or there is a minimum or a maximum in said central pixel.

22. The system of claim 18, wherein said zipper detector is configured for checking for the presence of zipper effect artifacts on a mask of pixels.

23. The system of claim 22, wherein said zipper detector is configured for checking for the presence of zipper effect artifacts on a mask of pixels selected out of a 5×5 mask of pixels and a 3×3 mask of pixels.

24. The system of claim 18 wherein said zipper effect removal module and said false color removal module are jointly configured for:
   for each pixel, leaving unchanged said detected color information for the first color;
   for each pixel, selecting a given neighborhood of said each pixel;
   producing at least one filtered interchannel difference over said given neighborhood of said each pixel, said at least one filtered interchannel difference involving the undetected filled-in color information for at least one of the second and third colors; and
   using said at least one filtered interchannel difference for performing both said zipper effect removal process and said false color removal process.

25. A zipper effect removal module for removing zipper effect artifacts from color image signals arranged in pixels, each pixel having associated detected color information for a first color as well as undetected filled-in color information for a second and a third color, the zipper effect removal module comprising:
   leaving means for leaving unchanged said associated detected color information for the first color for said each pixel;
   first selecting means for selecting a given neighborhood of said each pixel;
   second selecting means for selecting at least one filtered interchannel difference over said given neighborhood of said each pixel, said at least one filtered interchannel difference involving one of said second and a third colors;
   adding means for adding to the color corresponding to one of said undetected filled-in color information, said at least one filtered interchannel difference; and
   calculating means for calculating the other of said second and third colors as the average of some surrounding pixels of said each pixel.

26. The zipper effect removal module of claim 25, wherein the first selecting means select said surrounding pixels along a direction wherein said at least one inter-channel difference is substantially constant.

27. The zipper effect removal module of claim 25, wherein said least one filtered interchannel difference over said given neighborhood of said each pixel is a median filtered inter-channel difference.

28. The zipper effect removal module of claim 25, wherein said color image signals are red-green-blue image signals, said zipper effect removal module further comprising:
   setting means, if said first color is green, for setting:

$\hat{G}_{CENTER} = G_{CENTER}$ $\hat{H}_{CENTER} = f(H_{SURROUND})$ $\hat{J}_{CENTER} = G_{CENTER} + v_{JG}$ if said first color is red or blue, for setting:

$$\hat{G}_{CENTER}=f(G_{SURROUND})$$

$$\hat{H}_{CENTER}=H_{CENTER}$$

$$\hat{J}_{CENTER}=\hat{G}_{CENTER}+v_{JG}$$

where:
G is green, H is red or blue and J is blue or red, respectively;
$\ldots_{CENTER}$ designates said each pixel;
$\hat{\ }$ denotes signals resulting from the zipper effect removal process and replacing the colors at said each pixel;
$f(\cdot)$ is an average operator, whose inputs are the pixels surrounding said each pixel, along the direction provided by zipper detection;
$v_{JG}$=median$\{J_{ij}-G_{ij}|(i,j)\in \Re\}$ is said at least one interchannel difference;
and $\Re$ is a support of a median filter which covers said given neighborhood.

29. The zipper effect removal module of claim 25, wherein the selecting means select said given neighborhood out of a neighborhood including 3×3 pixels and a neighborhood including 5×5 pixels.

30. A system for processing color image signals of images arranged in pixels, each pixel having associated detected color information for a first color as well as undetected filled-in color information for a second and a third color, whereby said images are exposed to the presence of false color and zipper effect artifacts, the system comprising:
   a zipper detector configured to check said images for the presence of zipper effect artifacts;
   a zipper effect removal module configured to apply a zipper effect removal process to said color image signals if a checking by said zipper detector reveals the presence of zipper effect artifacts; and
   a false color removal module configured to apply a false color removal process to said color image signals if said checking by said zipper detector fails to reveal the presence of zipper effect artifacts;
   wherein said false color and zipper effect artifacts are both reduced by adaptively using said zipper effect removal process and said false color removal process, and wherein the false color removal module comprises:
   leaving means for leaving unchanged said detected color information for the first color for each pixel;
   selecting means for selecting a neighborhood of said each pixel;
   producing means for producing at least two filtered inter-channel differences over said neighborhood of said each pixel, said at least two filtered interchannel differences involving said second and third colors; and
   effecting means for effecting said false color removal using the at least two filtered interchannel differences, whereby a spectral correlation between color planes is taken into account in removing said false color artifacts.

31. The system of claim 30 wherein the producing means the produce the at least two filtered interchannel differences for false color removal from said undetected filled-in color information for both of the second and third colors.

32. The system of claim 30 wherein the producing means produce the at least two filtered interchannel differences as median filtered interchannel differences over said neighborhood of said each pixel.

33. The system of claim 30, wherein said color image signals are red-green-blue image signals, said false color removal module further comprising:

means, if said first color is green, for setting:

$$\hat{H}_{CENTER}=G_{CENTER}+v_{HG}$$

$$\hat{G}_{CENTER}=G_{CENTER}$$

$$\hat{J}_{CENTER}=G_{CENTER}+v_{JG}$$

and if said first color is either red or blue, for setting:

$$\hat{H}_{CENTER}=H_{CENTER}$$

$$\hat{G}_{CENTER}=H_{CENTER}-v_{HG}$$

$$\hat{J}_{CENTER}=H_{CENTER}-v_{HG}+v_{JG}$$

where:
G is green, H is red or blue and J is blue or red, respectively;
$\ldots_{CENTER}$ designates said each pixel;
$\hat{\ }$ denotes signals resulting from the false color removal and replacing the colors at said each pixel;
$v_{HG}$=median$\{H_{ij}-G_{ij}|(i,j)\in \Re\}$,
$v_{JG}$=median$\{J_{ij}-G_{ij}|(i,j)\in \Re\}$
are said interchannel differences;
and
$\Re$ is the support of a median filter which covers a local window surrounding said each pixel.

34. The system of claim 33 wherein said local window is selected out of windows including 3×3 pixels and 5×5 pixels.

35. A non-transitory computer-readable medium having contents that cause a computer to process color image signals of images arranged in pixels, each pixel having associated detected color information for a first color as well as undetected filled-in color information for at least a second and a third color, whereby said images are exposed to the presence of false color and zipper effect artifacts, the contents of the non-transitory computer-readable medium causing the computer to perform steps comprising:
   checking said color image signals for the presence of zipper effect artifacts, wherein said checking for the presence of zipper effect artifacts includes checking conditions that inter-channel differences between one of said second and third colors and said first color are almost constant along one direction of said images and not constant in a direction orthogonal thereto; and
   i) if said checking reveals the presence of zipper effect artifacts, applying a zipper effect removal process to said color image signals;
   ii) if said checking fails to reveal the presence of zipper effect artifacts, applying a false color removal process to said color image signals,
   whereby said false color and zipper effect artifacts are both reduced by adaptively using said zipper effect removal process and said false color removal process.

36. The non-transitory computer-readable medium of claim 35, wherein said zipper effect removal process and said false color removal process include the steps of:
   for each pixel, leaving unchanged said detected color information for the first color;
   for said each pixel, selecting a given neighborhood of said each pixel;
   producing at least one filtered interchannel difference over said neighborhood of said each pixel, said at least one filtered interchannel difference involving one of said undetected filled-in color information for the second and third colors; and using said at least one filtered interchannel difference for performing both said zipper effect removal process and said false color removal process.

37. A method of processing color image signals of images arranged in pixels, each pixel having associated detected color information for a first color as well as undetected filled-in color information for a second and a third color, whereby said images are exposed to the presence of false color and zipper effect artifacts, the method comprising the steps of:
checking said color image signals for the presence of zipper effect artifacts, and
i) if said checking reveals the presence of zipper effect artifacts, applying a zipper effect removal process to said color image signals;
ii) if said checking fails to reveal the presence of zipper effect artifacts, applying a false color removal process to said color image signals,
whereby said false color and zipper effect artifacts are both reduced by adaptively using said zipper effect removal process and said false color removal process, and wherein both said zipper effect removal process and said false color removal process include the steps of:
for each pixel, leaving unchanged said detected color information for the first color;
for said each pixel, selecting a neighborhood of said each pixel;
producing at least one filtered interchannel difference over said neighborhood of said each pixel, said at least one filtered interchannel difference involving one of said undetected filled-in color information for the second and third colors; and
using said at least one filtered interchannel difference for performing both said zipper effect removal process and said false color removal process.

38. A non-transitory computer-readable medium having contents that cause a computer to process color image signals of images arranged in pixels, each pixel having associated detected color information for a first color as well as undetected filled-in color information for at least a second and a third color, whereby said images are exposed to the presence of false color and zipper effect artifacts, the contents of the non-transitory computer-readable medium causing the computer to perform steps comprising:
checking said color image signals for the presence of zipper effect artifacts; and
i) if said checking reveals the presence of zipper effect artifacts, applying a zipper effect removal process to said color image signals;
ii) if said checking fails to reveal the presence of zipper effect artifacts, applying a false color removal process to said color image signals, whereby said false color and zipper effect artifacts are both reduced by adaptively using said zipper effect removal process and said false color removal process, and wherein said zipper effect removal process and said false color removal process include the steps of:
for each pixel, leaving unchanged said detected color information for the first color;
for said each pixel, selecting a given neighborhood of said each pixel;
producing at least one filtered interchannel difference over said neighborhood of said each pixel, said at least one filtered interchannel difference involving one of said undetected filled-in color information for the second and third colors; and
using said at least one filtered interchannel difference for performing both said zipper effect removal process and said false color removal process.

39. The non-transitory computer readable medium of claim 38 wherein said color image signals are red-green-blue image signals, and said zipper effect removal process includes the steps of:
if said first color is green, setting:

$$\hat{G}_{CENTER} = G_{CENTER}$$

$$\hat{H}_{CENTER} = f(H_{SURROUND})$$

$$\hat{J}_{CENTER} = G_{CENTER} + v_{JG}$$

if said first color is red or blue, setting:

$$\hat{G}_{CENTER} = f(G_{SURROUND})$$

$$\hat{H}_{CENTER} = H_{CENTER}$$

$$\hat{J}_{CENTER} = \hat{G}_{CENTER} + v_{JG}$$

where:
G is green, H is red or blue and J is blue or red, respectively;
$\ldots_{CENTER}$ designates said each pixel;
$\hat{\phantom{x}}$ denotes the signals resulting from the zipper effect removal process and replacing the colors at said each pixel;
f(·) is an average operator, whose inputs are the pixels surrounding said each pixel, along the direction provided by zipper detection;
$v_{JG} = \text{median}\{J_{ij} - G_{ij} | (i,j) \in \Re\}$ is said at least one interchannel difference; and
$\Re$ is the support of a median filter which covers said given neighborhood.

* * * * *

UNITED STATES PATENT AND TRADEMARK OFFICE
CERTIFICATE OF CORRECTION

PATENT NO.         : 7,791,648 B2
APPLICATION NO.    : 11/252376
DATED              : September 7, 2010
INVENTOR(S)        : Mirko Ignazio Guarnera et al.

It is certified that error appears in the above-identified patent and that said Letters Patent is hereby corrected as shown below:

Column 6
Claim 3, Line 60, "said orthogonal direction having not constant inter-channel" should read as --said direction orthogonal having not constant inter-channel--.

Column 9
Claim 19, Lines 48-49, "configured to evaluate a similarity of said inter-channel differences against a given threshold, whereby increasing said" should read as --configured to evaluate a similarity of said inter-channel differences against a threshold, whereby increasing said--.

Column 11
Claim 31, Line 62, "produce the at least two filtered interchannel differences as" should read as --produce the at least two filtered interchannel differences--.

Column 14
Claim 39, Line 24, "ĜCENTER=$G_{CENTER}$" should read as --$\hat{G}_{CENTER}=G_{CENTER}$--.

Column 14
Claim 39, Line 34, "$\hat{J}_{CENTER}$=ĜCENTER+$v_{JG}$" should read as --$\hat{J}_{CENTER}=\hat{G}_{CENTER}+v_{JG}$--.

Signed and Sealed this
Twenty-eighth Day of December, 2010

David J. Kappos
*Director of the United States Patent and Trademark Office*